United States Patent
Varnoux

(10) Patent No.: US 8,904,645 B2
(45) Date of Patent: Dec. 9, 2014

(54) METHOD FOR ASSEMBLING A ROLLER BEARING

(75) Inventor: Laurent Varnoux, Saint-Avertin (FR)

(73) Assignee: Aktiebolaget SKF, Gothenburg (SE)

( * ) Notice: Subject to any disclaimer, the term of this patent is extended or adjusted under 35 U.S.C. 154(b) by 601 days.

(21) Appl. No.: 13/260,409

(22) PCT Filed: Mar. 26, 2009

(86) PCT No.: PCT/EP2009/053573
§ 371 (c)(1),
(2), (4) Date: Oct. 31, 2011

(87) PCT Pub. No.: WO2010/108545
PCT Pub. Date: Sep. 30, 2010

(65) Prior Publication Data
US 2012/0047742 A1    Mar. 1, 2012

(51) Int. Cl.
B21D 53/10    (2006.01)
B23P 11/02    (2006.01)
F16C 43/08    (2006.01)

(52) U.S. Cl.
CPC .................. *F16C 43/08* (2013.01)
USPC ............... 29/898.062; 29/898.061; 29/450; 29/454; 29/453

(58) Field of Classification Search
CPC .......... F16C 43/04; F16C 43/06; F16C 43/08; F16C 19/06
USPC ............. 29/898.062, 898.061, 898.064, 454, 29/450, 453, 564.1, 724
See application file for complete search history.

(56) References Cited

U.S. PATENT DOCUMENTS

| | | | |
|---|---|---|---|
| 822,723 A | 6/1906 | Conrad | |
| 2,633,627 A | 4/1953 | Olmstead | |
| 2,885,767 A | 5/1959 | Barish | |
| 3,783,482 A | 1/1974 | Kunert et al. | |
| 4,699,527 A * | 10/1987 | Hutzel | 384/510 |
| 6,202,306 B1 * | 3/2001 | Miyazaki | 29/898.09 |

FOREIGN PATENT DOCUMENTS

| | | |
|---|---|---|
| DE | 2104063 A | 8/1972 |
| JP | 2004068985 A | 3/2004 |
| JP | 2006177507 A | 7/2006 |

* cited by examiner

*Primary Examiner* — Sarang Afzali
(74) *Attorney, Agent, or Firm* — Bryan Peckjian; SKF USA Inc. Patent Department

(57) ABSTRACT

A method for assembling a rolling bearing by deformation of the outer ring (OR) and/or the inner ring (IR) comprising, before said step of deformation, determining the theoretical position (1', 2') that the two extreme rolling elements should occupy so as to allow inserting at least one supplemental rolling element (11) in said space (13), said theoretical position defining an acute application angle ($\alpha 2$) determining the value of forces (F1) to be applied from outside to said outer ring (OR) at three application points, one central point at said nearest or contact location of both inner an outer rings in said symmetry plane and two lateral points at an angle ($2\alpha 2$) equal to the double of said acute application angle with respect to said symmetry plane, verifying that the deformation of the outer ring (OR) resulting from the application of said forces remains elastic and in that case, applying said forces and inserting at least one supplemental rolling element in said space.

6 Claims, 2 Drawing Sheets

METHOD FOR ASSEMBLING A ROLLER BEARING

BACKGROUND OF THE INVENTION

The present application relates to a method of assembling a rolling bearing by inserting rolling elements between the outer ring and the inner ring of such a rolling bearing. The object of the invention is not limited to the type of rolling bearing which can include all sorts of rolling bearings including those having one or two rows of rolling elements maintained between the inner and outer rings or inner and outer ring assemblies. The rolling elements may be maintained at appropriate relative positions by one or several cage elements. The rolling elements can be balls, cylinders, or any similar rolling elements suitable for being mounted between the two rings of the bearing for supporting a rotatable mechanical element with regard to a non rotatable element. Generally speaking, the rolling elements are rolling on races of suitable shape provided on the inside periphery of the outer ring, and on the outside periphery of the inner ring.

It is advantageous for increasing the load capacity of the bearing, to insert the maximum possible number of rolling elements in the bearing.

The conventional method for assembling rolling bearings is illustrated by U.S. Pat. No. 822,723 to Robert Conrad. According to the method disclosed in this document for a ball bearing, the two rings are eccentrically displaced to each other, defining a crescent shape space in which balls can be introduced. The number of balls which can be introduced may be increased by effecting a slight elastic deformation.

In order to increase the number of balls which can be inserted between the two rings of a ball bearing, it has been further suggested to apply a force on two diametrically opposed locations on the outer ring or the inner ring, or on both said rings, when both rings have been eccentrically displaced according to the Conrad method. This is disclosed in U.S. Pat. No. 2,633,627, German patent application 2 104 063 or JP 2006-177 507. It has also been proposed to apply forces on four points, on the outer ring, as disclosed in JP 2004-068 985, or on three points at 120° on the outer ring as disclosed in U.S. Pat. No. 2,885,767 which also provides similar application of forces on the inner ring.

It has appeared however that none of those disclosed methods permits to reach the limit of the maximum possible number of rolling elements to be inserted between the two rings of a rolling bearing. There is therefore a need for a further improved method of assembling such a rolling bearing which would permit to further increase the number of rolling elements which can be inserted.

SUMMARY OF THE INVENTION

It is therefore the primary object of the present invention to propose a new improved method of assembling a rolling bearing by inserting an increased number of rolling elements between the outer and the inner rings of the rolling bearing.

In order to reach this goal, it is now proposed a method for assembling a rolling bearing having an outer and an inner ring and at least one row of rolling elements there between, which comprises positioning the inner ring eccentrically within the outer ring so as to form a crescent shape space, successively inserting a number of rolling elements in said space until all said rolling elements are contacting each other and two extreme rolling elements are contacting both the inner and the outer rings.

In that position, the two extreme rolling elements are located symmetrically with regard to a symmetry plane passing by the geometric centers of both the inner and the outer rings and by the point where said inner and outer rings are the nearest or in contact with each other.

The method also comprises elastic deforming the outer ring by applying forces from outside to three points on the periphery of said outer ring.

The method further comprises, before said step of deformation, determining the theoretical position that the two extreme rolling elements should occupy so as to allow inserting at least one supplemental rolling element in said crescent shape space. This theoretical position defines an acute application angle between said symmetry plane and a line joining the geometrical center of the outer ring and the geometrical center of one of said extreme rolling elements.

The method further comprises determining the value of forces to be applied from outside to said outer ring at three application points, one central point at said nearest or contact location of both inner an outer rings in said symmetry plane and two lateral points at an angle equal to the double of said acute application angle with respect to said symmetry plane; verifying that the deformation of the outer ring resulting from the application of said forces remains elastic; and in that case, applying said forces and inserting at least one supplemental rolling element in said crescent shape space.

Such a method allows to insert a greater number of rolling elements in the crescent shape space left between the inner and outer rings in an eccentric position without exceeding the elastic limit of the material constituting the outer ring.

The determination of the theoretical position of the extreme rolling elements allowing insertion of at least one supplemental rolling element leads to a certain angle which can then be used in a calculation of forces to be applied in three points so as to verify that the elastic limit is not exceeded. The calculation of forces can be made by any appropriate method, for example an analytical method or a finite element method.

By first verifying the deformation and taking into account the elastic limit of the material, it is possible to ascertain that the insertion of the supplemental rolling element will be possible without permanently deforming the outer ring.

According to a preferred embodiment, the method further comprises determining an acute application angle between said symmetry plane and a line joining the geometrical center of the inner ring and the geometrical center of one of said extreme rolling elements, determining the value of forces to be applied from inside to said inner ring at three application points, one central point at said nearest or contact location of both inner an outer rings in said symmetry plane and two lateral points at an angle equal to the double of said acute application angle with respect to said symmetry plane, verifying that the deformation of the inner ring resulting from the application of said forces remains elastic and in that case, applying said forces before inserting at least one supplemental rolling element in said space.

By deforming both the outer and the inner rings at the three specific points mentioned above, it is possible to further increase the number of rolling elements which can be inserted without permanently deforming both the inner and the outer rings.

If it appears from the theoretical position of the extreme rolling elements that the acute application angle defined in relation with the inner ring is near to 90°, it is also possible to simplify the method in applying forces to said inner ring at only two diametrically opposed points. This can be the case if said two lateral points are separated by less than 10°.

The method can also be repeated after it has been ascertained that insertion of one supplemental rolling element can be made without permanently deforming the outer ring and/or the inner ring. In that case, after having determined the value of forces to be applied and having verified that the deformation remains elastic with the theoretical position that the two extreme rolling elements should occupy so as to allow inserting one supplemental rolling element in said space, a further theoretical position is determined to allow inserting a further supplemental rolling element in said space and a new determination of the value of forces to be applied as well as a new verification that the deformation remains elastic with the further theoretical position are performed before applying said forces and inserting the supplemental rolling elements in said space.

In such a way, it is possible to insert more than one supplemental rolling element if calculation has shown that such an insertion is possible without permanent deformation of the outer and/or inner ring.

The steps of determination of the value of forces to be applied and of verification that the deformation remains elastic can be repeated more than once with each time a further theoretical position of the two extreme rolling elements, until the limit of the elastic deformation is reached.

The maximum number of supplemental rolling elements which can be inserted in the crescent shape space without exceeding the elastic limit can thus be determined precisely, before applying the forces and effectively inserting said maximum number of supplemental rolling elements in said space.

The method can be applied to any type of rolling bearing, for example to ball bearings where the rolling elements are balls or to rolling bearings where the rolling elements are cylindrical rollers.

The rolling bearings may have more than one row of rolling elements.

BRIEF DESCRIPTION OF THE DRAWINGS

The invention will be better understood in connection with the enclosed drawings, which relate to non-limiting examples illustrating methods according to the present invention.

DETAILED DESCRIPTION OF THE PREFERRED EMBODIMENTS

Figure 1:
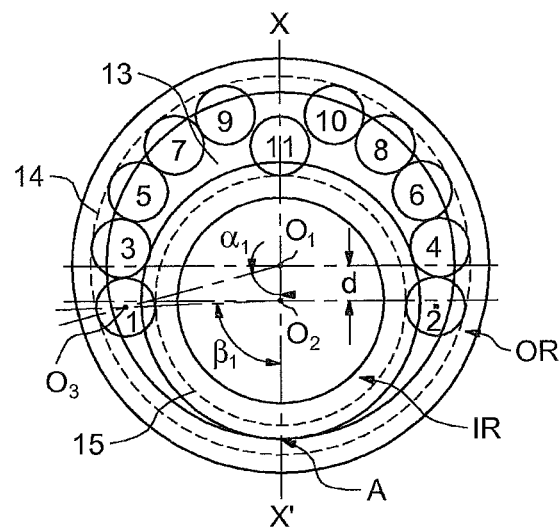
FIG. 1 shows a schematical illustration of a ball bearing assembly including an inner ring and a outer ring eccentrically displaced with each other, and showing a first number of balls during the insertion process between the two rings.

Referring more particularly to the drawings, there is shown on FIG. 1 a side view of a ball bearing having an inner ring IR and an outer ring OR. The inner ring IR has been eccentrically displaced within the outer ring OR so that the geometric center O2 of the inner ring IR has been displaced with regard to the geometrical center O1 of the outer ring OR of a distance d. Following this displacement, a certain number of balls have been inserted between the two rings IR and OR on both sides of a symmetrical plane X-X'. In the illustrated example, ten balls of spherical shape noted 1 to 10, are inserted into a crescent shape space 13, which is left between the two rings IR, OR, on the opposite side of a point A at which the inner ring IR is contacting the outer ring OR. As shown on FIG. 1, five balls noted 1, 3, 5, 7 and 9 are located on the left side of plane X-X', and five balls noted 2, 4, 6, 8 and 10 are located on the right side of plane X-X'. All those ten balls are in contact with a race 14 of toroidal shape, provided on the inner periphery of the outer ring OR. Two extreme balls noted 1 and 2, located respectively on the left and on the right side of the symmetry plane X-X' are also in contact with a race 15 defined on the outer periphery of the inner ring IR. The two extreme balls 1 and 2 thus block any further movement of the other balls toward the narrow ends of the crescent shape space 13.

One supplemental ball noted 11, has also been inserted within the crescent shape space 13 but is not contacting the outer race 14. This supplemental ball 11 is therefore not completely inserted and would not permit assembling of the ball bearing by shifting back the inner ring IR in its central position where both centers O1 and O2 are in the same position.

In order to fully insert the supplemental ball 11, it is therefore necessary to produce a certain deformation of the outer ring OR or the inner ring IR or both said rings. Such a deformation must of course remain within the elastic domain.

The present invention aims at defining the precise position of forces to be applied to produce such deformation, so as to allow insertion of the maximum possible number of supplemental balls within the elastic deformation domain of the material used for both the outer and inner rings.

Two specific angles are defined with regard to the position of the extreme balls 1 and 2 on FIG. 1. It must be noted that the two extreme balls 1 and 2 are respectively symmetrically positioned with regard to the symmetry plane X-X'. Only the angles relating to the extreme ball 1 have been noted on FIG. 1. It is to be understood that equal angles relating to the extreme ball 2 can be defined. If the center of the extreme ball 1 is noted O3, the acute angle $\alpha 1$ is defined as O3, O1, X'. This angle $\alpha 1$ therefore represents the acute angle between the symmetry plane X-X' and a line O1, O3 joining the symmetrical center O1 of the outer ring OR and the geometrical center O3 of the extreme ball 1.

In the same way, an angle $\beta 1$ is defined as an acute angle O3, O2, X' which is the acute angle between the symmetry plane X-X' and the line O2, O3 joining the geometrical center of the inner ring IR and the geometric center of the extreme ball 1.

Figure 2:
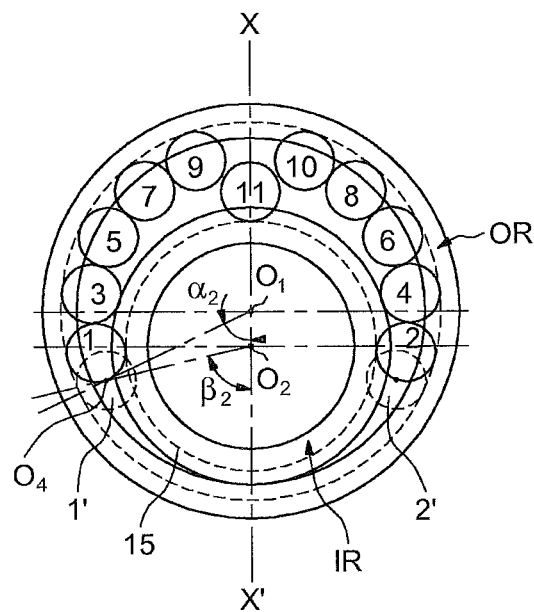
FIG. 2 illustrates the same ball bearing showing also the theoretical position of two extreme balls which would permit to insert a supplemental ball.

FIG. 2 illustrates a step of determination of a geometrical position that the two extreme balls 1, 2 should occupy so as to allow insertion of the supplemental ball 11 up to the position where it can enter into contact with the outer race 14 of the outer ring OR. This position is illustrated in dotted line and is noted 1' and 2' on FIG. 2. It is clearly shown on FIG. 2 that this corresponds to a theoretical position since the two extreme balls 1', 2' would, in this position, exceed the geometric limit of the inner race 15 and penetrate within the material of the inner ring IR.

The same angles as previously defined on FIG. 1 are defined on FIG. 2 with regard to the theoretical position of balls 1' and 2'. On FIG. 2, only the angles relating to the theoretical position 1' of the extreme ball 1 have been noted since the angles for the theoretical position 2' of the extreme ball 2 are symmetrical with regard to the symmetry plane X-X'. Angle $\alpha 2$ is defined as the acute angle between the symmetry plane X-X' and the line joining the geometrical center O1 of the outer ring OR with the geometrical center O4 of the theoretical position of ball 1'. Angle β2 is defined between the symmetry X-X' and the line joining the geometrical center O2 of the inner ring IR with the geometrical center O4 of the theoretical position 1' of the extreme ball 1.

Following the determination of those two angles α2 and β2, the value of forces to be applied from outside to the outer ring OR at three application points, is calculated. Those three forces, which are all of equal value, are noted F1 on FIG. 3. The first of those forces is applied in the symmetry plane X-X' at the point where the inner ring IR contacts the outer ring OR. The two other forces F1 are applied symmetrically with regard to the symmetry plane X-X' at an angle equal to 2α2. The three forces F1 are applied radially from outside with regard to the geometrical center O1 of the outer ring. The forces F1 produce a deformation of the outer ring which increases the crescent shape space 13.

Figure 3:
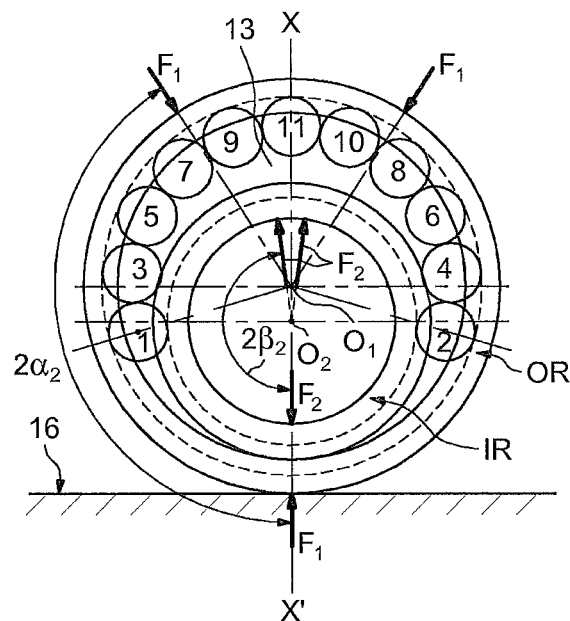
FIG. 3 illustrates the same bearing after deformation upon the application of forces both to the outer and the inner rings, so as to allow insertion of a supplemental ball.

In the example illustrated on FIG. 3, three forces are also applied from inside to the inner ring IR. Those three forces are noted F2. The first of those forces F2 is applied within the symmetry plane X-X' at the point where both inner ring IR and outer ring OR contact each other in an opposite direction to the first force F1. The two other forces F2 are applied symmetrically with regard to the symmetry plane X-X' at an angle equal to 2β2. The three forces F2 are applied radially from inside with regard to the geometrical center O2 of the inner ring IR. In a particularly simple way of applying the various forces F1 and F2, which is illustrated on FIG. 3, the assembly of the inner ring IR and outer ring OR is pressed against a reaction plane 16 orthogonal to the symmetry plane X-X', while compression forces are applied with values F1 on the two points at 2α2 on both sides of the symmetry plane X-X'. Inside of the inner ring, an extension element can be positioned so as to apply the forces F2. The choice of the value of the forces F1 and F2 is made so as to maintain the resulting deformation of both the inner IR and the outer ring OR within the elastic domain. It is advisable to first determine by calculation the deformation which can be obtained by applying those forces F1 and F2 resulting in an increase of the crescent shape space 13, which is sufficient so as to permit introduction of the supplemental ball 11. As illustrated on FIG. 3, the supplemental ball 11 is located between the two balls 9, 10, in contact with the outer race 14 of the outer ring OR.

While the description of the method has been made with regard to the application of forces both to the outer ring and the inner ring, it must be understood that deformation can be produced only to the outer ring by application of the three forces F1 or only to the inner ring by application of the three forces F2.

Also, while in the example illustrated, the eccentric position of the inner ring was such that the inner ring was contacting the outer ring within the symmetry plane X-X' at point A, it must be understood that in other embodiments, it is possible that the inner ring does not contact the outer ring at the symmetry plane, but remains at a slight distance from said outer ring.

In an advantageous embodiment of the present invention, it is also possible, after calculation of the various forces to be applied to either one of the inner or outer ring or to both rings, to determine whether a further ball could be inserted within the crescent shape space 13. In order to make this further determination, the two extreme balls 1 and 2, located in the positions illustrated on FIG. 3, are further displaced in theoretical positions, not illustrated on FIG. 3, which would correspond to the possibility of insertion of a further ball 12. In the same way as illustrated on FIG. 2, new angles α'2 and β'2 are defined with regard to the geometrical center of the extreme balls 1' and 2' as illustrated on FIG. 4. The same calculation of forces is then made to determine the value of forces F'1 and F'2, as well as the position of their application on the outer ring OR and on the inner IR so as to provide the corresponding deformation of both the outer ring and the inner ring. The position of the two lateral forces F'1 corresponds to the double angle 2α'2 with regard to the symmetry plane X-X' in which the central force F'1 is located. The position of the two located forces F'2 corresponds to the double angle 2β'2 with regard to the symmetry plane X-X' in which the central force F'2 is located.

Figure 4:
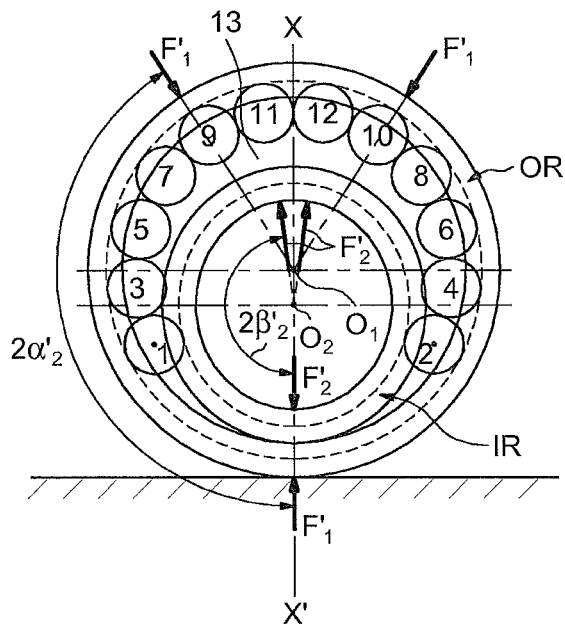
FIG. 4 illustrates in a similar way as FIG. 3, the application of further forces on the inner and outer rings, so as to produce a further deformation allowing insertion of still another supplemental ball.

As in FIG. 3, the three forces F'1 of FIG. 4 are applied radially with regard to the center O1 of the outer ring, while the three forces F'2 are applied radially with regard to the geometrical center O2 of the inner ring IR.

If the calculation shows that the forces F'1 and F'2 to be applied in the three points thus defined so that the obtained deformation permits insertion of a further ball without exceeding the elastic limit of the material constituting the inner ring and the outer ring, the effective insertion can be made by applying said forces in the way illustrated on FIG. 4, thus allowing insertion of two supplemental balls 11 and 12.

If necessary, a further calculation can be made to check whether a third supplemental ball could be inserted without exceeding the elastic limit of the material. The method is thus repeated until the calculation shows that elastic limit would be reached.

While application of two forces F2 or F'2 on the inside of the inner ring IR with the respective angles 2β2 or 2β'2 illustrated on FIGS. 3 and 4, it must be noted that it is also possible to apply only two diametrically opposite forces F2 or F'2 to the inside surface of the inner ring IR, since the angles 2β2 and 2β'2 are near to 180°. Application of two diametrically symmetrical forces F2 or F'2 is therefore almost identical to the application of the three forces illustrated on FIG. 3 and FIG. 4 with lateral forces applied at points separated by less than 10°.

While the examples have been disclosed on the basis of a ball bearing with insertion of balls, it must be understood that the same methods could be applied similarly to other types of rolling elements such as cylindrical rollers, for example.

The present invention thus permits to verify first by calculation if the outer or inner rings, or both rings can be deformed so as to allow insertion of a maximum number of supplemental rolling elements, before effectively applying forces on said rings and inserting the supplemental rolling elements without exceeding the elastic limit of the materials of the outer and inner rings.

The invention claimed is:

1. A method for assembling a rolling bearing having an outer and an inner ring and at least one row of rolling elements therebetween, the method comprising:

positioning the inner ring eccentrically within the outer ring so as to form a crescent shape space;

successively inserting a number of rolling elements in said crescent shape space until all said rolling elements are contacting each other and two extreme rolling elements are contacting both the inner and the outer rings, said two extreme rolling elements being located symmetrically with regard to a symmetry plane passing by geometric centers of both the inner and the outer rings and by a point where said inner and outer rings are at least one of closest to each other and in contact with each other;

elastically deforming the outer ring by applying outer forces from outside of the outer ring to three outer points on an outer periphery of said outer ring, wherein before said step of elastically deforming the outer ring, determining a theoretical position that the two extreme rolling elements should occupy so as to allow inserting at least one supplemental rolling element in said crescent shape space, and wherein said theoretical position defining a first acute application angle between said symmetry plane and a line joining the geometrical center of the outer ring and a geometrical center of one said extreme rolling elements;

determining a value of the outer forces to be applied to said outer ring at the three outer points, the three outer points including one central point aligned with the point and two lateral points at an angle equal to the double of said first acute application angle with respect to said symmetry plane;

verifying that the deformation of the outer ring resulting from the application of said outer forces to the outer ring remains elastic; and if the outer ring remains elastic, applying said outer forces to the outer ring and inserting the at least one supplemental rolling element in said crescent shape space.

2. The method of claim 1 further comprising:

determining a second acute application angle between said symmetry plane and a line joining the geometrical center of the inner ring and the geometrical center of one of said extreme rolling elements, determining the value of inner forces to be applied to an inside of the inner ring at three inner points on an inner surface of the inner ring, the three inner points including one central inner point aligned with the point and two lateral inner points at an angle equal to the double of said second acute application angle with respect to said symmetry plane;

verifying that the deformation of the inner ring resulting from the application of said inner forces to the inner ring remains elastic; and if the inner ring remains elastic, applying said inner forces to the inner ring before inserting the at least one supplemental rolling element in said crescent shape space.

3. The method of claim 2, wherein the inner forces are applied to said inner ring at only two diametrically opposed points if said two lateral points are separated by less than 10°.

4. The method of claim 1, wherein after having determined the value of the outer forces to be applied to the outer ring and having verified that the deformation of the outer ring remains elastic with the theoretical position that the two extreme rolling elements should occupy so as to allow inserting one supplemental rolling element in said crescent shape space, a further theoretical position is determined to allow inserting a further supplemental rolling element in said crescent shape space and a new determination of the value of the outer force to be applied as well as a new verification that the deformation remains elastic with the further theoretical position are performed before applying said outer force to the outer ring and inserting the one supplemental rolling element and the further supplemental rolling element in said crescent shape space.

5. The method of claim 4, wherein said steps of determining the value of the outer force to be applied and verifying that the deformation of the outer ring remains elastic are repeated until a limit of the elastic deformation of the outer ring is reached, whereby a maximum number of supplemental rolling elements which can be inserted in said crescent shape space without exceeding said limit is determined, before applying said outer force to the outer ring and inserting said maximum number of supplemental rolling elements in said crescent shape space.

6. The method of claim 1, wherein said rolling bearing is a ball bearing, and said rolling elements are balls.

* * * * *